United States Patent [19]

Dean et al.

[11] 3,908,286
[45] Sept. 30, 1975

[54] APPARATUS FOR DEMONSTRATING GROUNDING PRINCIPLES

[76] Inventors: Joseph M. Dean, 671-63rd St., Des Moines, Iowa 50312; Kenneth G. Olson, 3518 48th Street Place, Des Moines, Iowa 50310

[22] Filed: Nov. 12, 1973

[21] Appl. No.: 414,678

[52] U.S. Cl. .................................. 35/19 A; 324/51
[51] Int. Cl.[2] ...................................... G09B 23/06
[58] Field of Search ............. 35/13, 19 R, 19 A, 54, 35/8 R; 40/52 R, 130 L, 132 D; 235/184, 235/185; 317/99, 118, 120; 324/51, 66; 339/113; 340/255

[56] References Cited
UNITED STATES PATENTS

| | | | |
|---|---|---|---|
| 2,796,683 | 6/1957 | Hayne | 35/19 A |
| 2,877,569 | 3/1959 | Eisenberg | 35/13 |
| 3,043,022 | 7/1962 | Crens et al. | 35/19 A |
| 3,222,597 | 12/1965 | Beatenbough et al. | 35/19 A X |
| 3,383,588 | 5/1968 | Stoll et al. | 339/113 L |
| 3,810,003 | 5/1974 | Portoulas | 324/66 X |

*Primary Examiner*—Robert W. Michell
*Assistant Examiner*—Vance Y. Hum
*Attorney, Agent, or Firm*—Zarley, McKee, Thomte & Voorhees

[57] ABSTRACT

An electrical grounding demonstrator for use on a 15-ampere or 20-ampere, 120 volt, 60 hz., 2-wire grounded neutral electric supply circuit, is comprised of a first circuit, a second circuit, a power circuit, a plurality of electrical receptacles, and a plurality of terminals for use in measuring ground loop impedances, or ground resistances, by equipment not contained in this demonstrator. The first circuit includes an indicator light representing a human ground fault situation, and further has a ground fault circuit interrupter therein. Switch means are provided for alternatively switching the ground fault circuit interrupter into and out of the circuit. The second circuit includes two resistors therein and a volt meter adapted to be connected across either of two resistors, separately, which simulate typical ground resistance values. The power circuit includes switch means for selectively introducing power to all of the circuits. The ground loop impedance terminals are adapted to receive a probe from a ground loop impedance tester or ground resistance meter, so as to illustrate the various impedances found in the circuit of the testing device. A plurality of receptacles is connected to the power circuit, each of the receptacles being wired differently to illustrate proper wiring and improper wiring according to O.S.-H.A. and N.E.C. regulations.

3 Claims, 3 Drawing Figures

U.S. Patent Sept. 30, 1975 3,908,286
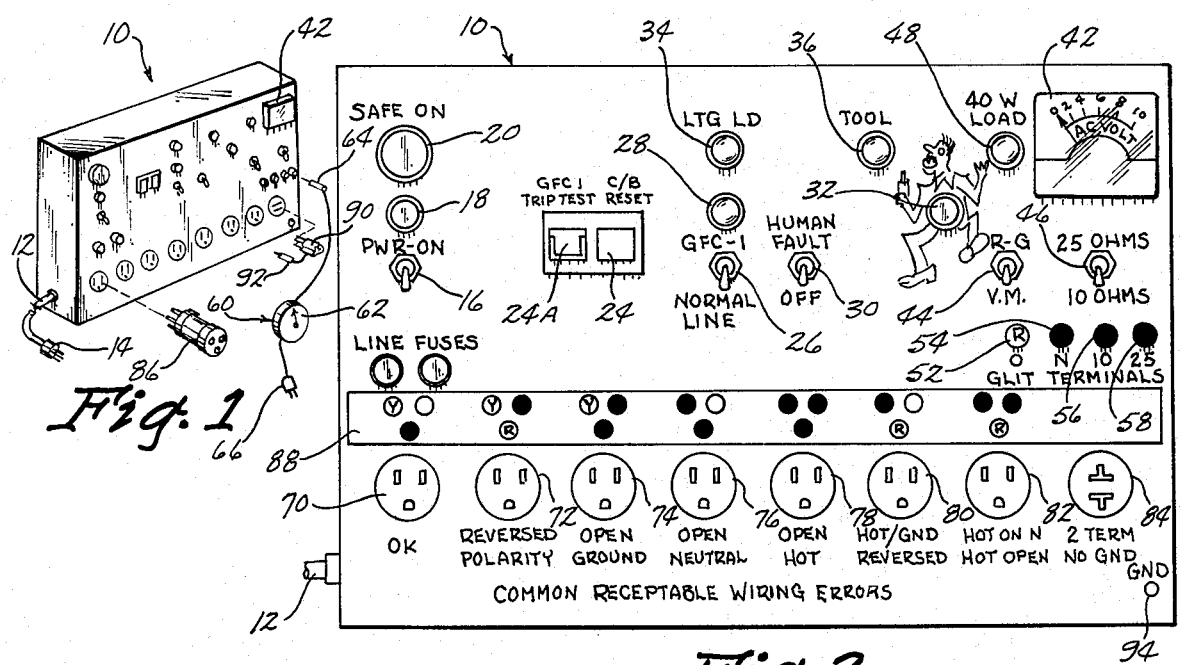
Fig. 1
Fig. 2
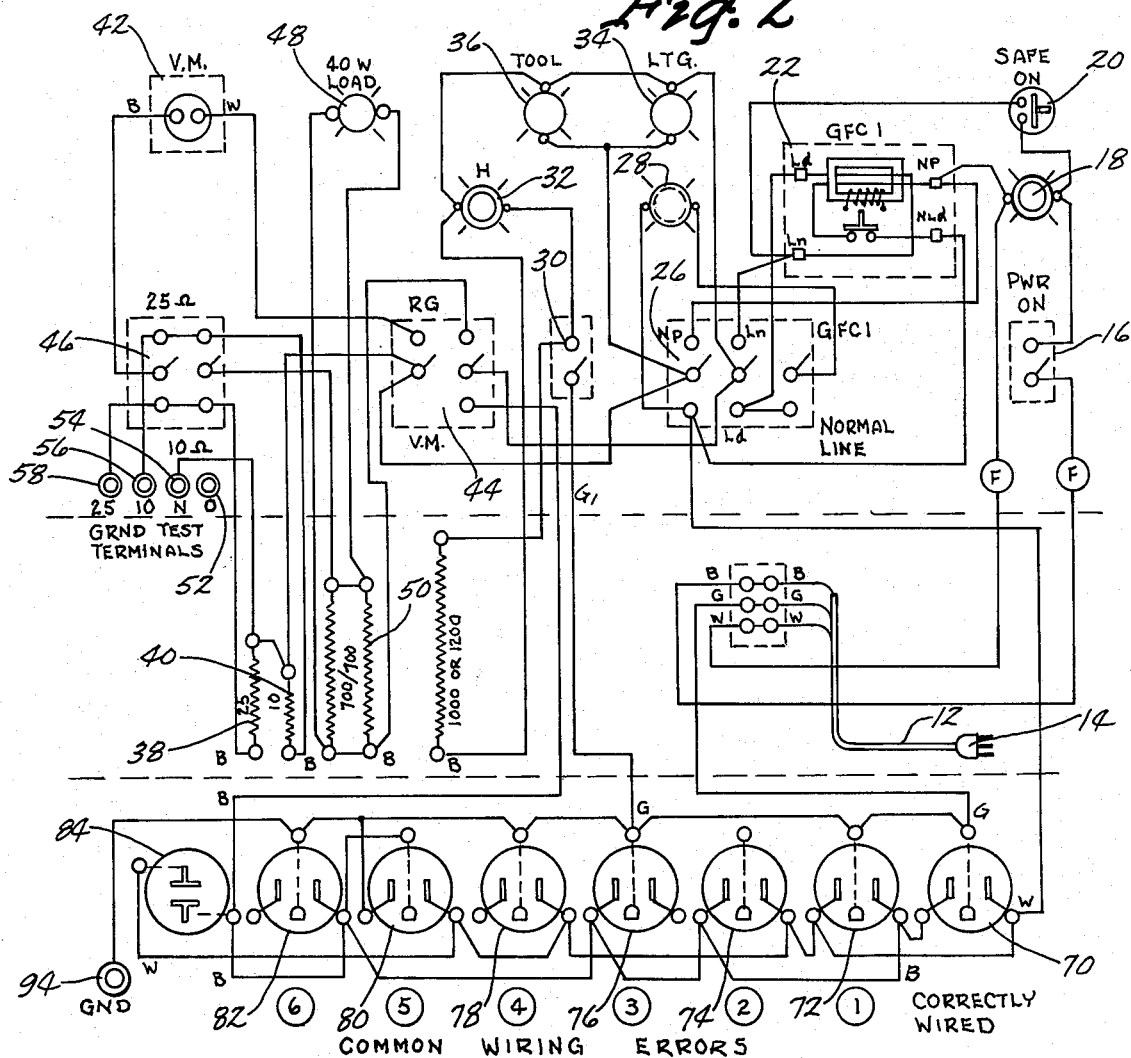
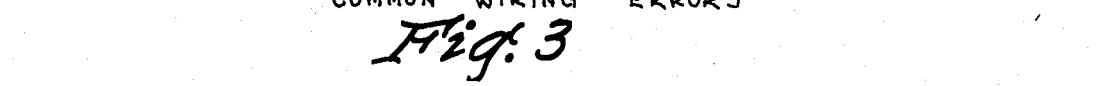
Fig. 3

APPARATUS FOR DEMONSTRATING GROUNDING PRINCIPLES

The present invention relates to a method and means for demonstrating grounding principles.

The principles relating to grounding of electrical circuits are difficult to teach without some means of visually demonstrating these principles. Since the current National Electrical Code (1971) is a "performance" code instead of a "specification" code, its requirement for "Effective Grounding" does not set forth specific quantitative values required for code compliance but only states objectives which will result in "effective grounding." Therefore, during the training of personnel for any activity related to electrical circuitry and utilization equipment, it becomes necessary to explain specific and functional considerations that will result in effective grounding.

A recent development in the art of safety devices for 120/240 volt AC circuits is a device referred to as a ground fault circuit interrupter. It therefore becomes important to explain to students how this device operates in a circuit.

One important aspect of the training of any persons concerned with the study of electrical utilization and safety, is adequate instruction in the testing of outlets to determine whether or not the outlets are adequately grounded. Recently, receptacle testing devices have appeared on the market for testing three terminal outlets to determine whether or not they are adequately wired. An example of such a testing device is a tester illustrated in U.S. Pat. No. 3,383,588. Therefore the training of students in electrical circuitry and equipment should necessarily include a demonstration of how to use these new testing devices.

Therefore, a primary object of the present invention is the provision of a device which will demonstrate by simple means and terms, the above referred to concepts of grounding in the safe distribution and utilization of electrical energy.

A further object of the present invention is the provision of a device which will demonstrate the operation of a GFCI in a circuit.

A further object of the present invention is the provision of a device which will demonstrate the effect of different resistance values in a grounding circuit.

A further object of the present invention is the provision of a device which will demonstrate how to test a grounding-type receptacle to determine if it is wired correctly.

A further object of the present invention is the provision of a device which incorporates a plurality of circuits which can readily be activated to demonstrate a variety of principles.

A further object of the present invention is the provision of a device which is economical to manufacture, durable in use and attractive in appearance.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a pictorial view of the demonstrator device of the present invention.

FIG. 2 is a front elevational view of the front of the device illustrating the various switches and indicator lights thereon.

FIG. 3 is a schematic wiring diagram viewed facing the back of the panel of the circuitry of the present device.

REFERRING TO THE DRAWING

The number 10 generally designates the demonstrator, or the present device. The electrical circuitry of the present device is shown in the wiring diagram of FIG. 3, and this diagram will not be shown in detail inasmuch as one skilled in the art can readily understand this diagram. Demonstrator 10 includes a cord 12 having a plug 14 which is adapted to plug into a conventional 3-wire grounded receptacle. A power circuit is connected to cord 12 and includes a power-on switch 16 which is adapted to permit the introduction of power into the circuit of device 10. A power indicator light 18 is connected in the power circuit to indicate whether or not the power is on or off. Also, a safe-on switch 20 is provided in the power circuit. Switch 20 normally is in an open circuit position so as to preclude power from being entered into the remainder of the demonstrator device. Switch 20 must be depressed in order to close the circuit. Thus power is never introduced into the device until the operator depresses the safe-on switch 20.

A GFCI is generally indicated in the wiring circuit at 22. Such devices are well known in the art, and serve the purpose of sensing a ground fault in the circuit(s) to which they are connected. When such a ground fault occurs, the GFCI senses the ground fault and immediately interrupts the circuit so as to prevent a continued ground fault situation. The GFCI includes a modifed conventional circuit breaker with reset button 24 accessible from front surface of the demonstrator device and an associated test button, 24-A, alongside the reset button, for periodically checking the dependability of the GFCI fault sensing and tripping ability. A GFCI switch 26 is provided for alternatively connecting the GFCI into the power circuit or out of the power circuit as the operator may desire. A GFCI indicator light 28 indicates whether or not the GFCI is in the circuit.

A human fault circuit includes a human fault switch 30 which permits switching a human fault indicator light 32 into the power circuit. Other indicator lights 34 and 36 illustrate other types of loads which may be on the circuit such as tools or lights in a conventional house circuit.

In order to demonstrate the operation of the GFCI, the operator turns on the power-on switch 16, turns off the GFCI swtich 26, and turns on the human fault switch 30. The operator then depresses the safe-on switch which causes indicator lights 34, 36, and 32 to be actuated. This demonstrates what would happen on a situation wherein the person encounters a ground fault. The fact that light 32 is on indicates that the person would be encountering electrical shock. The operator then releases safe-on switch 20 and switches the GFCI switch 26 to the on position. This introduces the GFCI into the circuit. The safe-on switch 20 is again depressed, energizing light 32, depicting a ground fault through a man's heart or vital organs as some current in the circuit is unintentionally by-passed through the man's body to ground.

However, almost instantly the sensor in the GFCI detects the fault current and trips the circuit breaker, immediately de-energizing the circuit to lights 28, 34, 36 (representing the hand tool) and 32 (representing the man).

This demonstration produces visual evidence that the sensing element of the GFCI opens the circuit breaker fast enough to limit both the amplitude and duration of fault current through a man to levels well below those which normally healthy persons can tolerate. It is a very impressive illustration of how the GFCI works to protect people.

In order to demonstrate the meaning of "effective grounding" a pair of grounding circuits is provided, one with a 25 ohm resistor therein which is indicated by the numeral 38 in the schematic diagram, and the other with a 10-ohm resistor therein which is indicated by the numeral 40. A volt-meter 42 is provided in the device and includes the voltmeter switch 44 for introducing the voltmeter into the circuit with the resistors 38, 40. Also a resistor switch 46 is provided for selectively connecting volt meter 42 across either the 25-ohm resistor or the 10-ohm resistor. Similarly a load indicator light 48 is connected in the circuit across the resistor(s) 50 which approximate the load equivalent to a 40-watt light bulb in a conventional electric circuit.

The purpose of the 25 ohm and 10 ohm resistors is to introduce into the normal circuit additional resistance, of those respective values, to the normal ground resistance of the circuit. The effects of such ground resistance values can then be demonstrated by the volt meter 42 or separate ground resistance measuring instrument in conjunction with panel terminals, 52, 54, 56 and 58.

In operation, the power-on switch 16 is switched to the on position, the GFCI switch is switched to the off or normal line position, the human fault switch 30 is switched to the off position, the voltmeter switch 44 is switched to the on position, and the resistor switch 46 is switched to the 10 ohm resistance circuit. The safe-on switch is depressed, and the voltmeter registers a voltage drop across the 10 ohm resistor. The second portion of the demonstration involves switching the resistor switch 46 to the 25 ohm resistor position thereby switching on the 25 ohm resistor rather than the 10 ohm resistor into the circuit. The volt meter then registers a higher reading for the voltage drop across the 25 ohm resistor. It can be observed that the lower the resistance of a ground connection or junction, for a given ground current, the lower the potential drop (voltage) across said junction and vice-versa, and it becomes evident that resistances and currents of even nominal values can readily approach "ground drop potentials" that may be considered hazardous to personnel and even to systems. This graphically illustrates to the student how the varying resistances in the grounding circuit can affect the effectiveness of a grounding circuit.

The measurement of "ground loop impedance" or "ground resistance" of the grounding system of a circuit can be accomplished or facilitated by the panel circuitry connected to terminals 52, 54, 56 and 58. Terminal 52 is connected to nothing and therefore represents an open circuit situation. Terminal 54 is connected directly to the grounded neutral line of the circuit and thus permits an undistorted measurement of the ground loop impedance of the system to which the demonsrator is connected, or permits a nearly direct reading of the ground junction resistance by means of a direct reading ground resistance meter. Terminal 56 is connected through the 10 ohm resistor to the grounded neutral line and hence will register a reading 10 ohms than when measuring device is contacting the grounded neutral. Terminal 58 is connected through the 25 ohm resistor to the grounded neutral and accordingly will produce an instrument reading 25 ohms higher than when instrument is connected to grounded neutral line. A ground loop impedance tester 60 is shown in FIG. 1, and is of conventional construction known in the art. This tester includes a meter 62, a probe 64 for engaging terminals 52, 54, 56, 58 and a plug 66. This tester 60 must be energized from a correctly wired grounding receptacle and then the probe 64 is contacted to various grounded points of the ciruit, or associated grounded items to be tested.

In order to demonstrate the ground loop impedance of the device, plug 66 of ground loop impedance tester 60 is plugged into receptacle 70, and probe 64 is alternatively connected to each of the four terminals 52, 54, 56 and 58. The tester will register the various impedance or resistances of the grounding portion of the circuitry connected to each terminal.

The final demonstration which can be performed on the present demonstrator involves the plurality of grounding type receptacles (70, 72, 74, 76, 78, 80, and 82) and one non-grounding type receptacle 84 mounted across the bottom of the panel of device 10. Each receptacle is wired differently to demonstrate various manners in which such receptacles can be wired, either in compliance with the National Electric Code standard or otherwise. Part of the demonstration is to point out the safety feature provided by the receptacle design and the prescribed standard wiring method, and to emphasize the fact that non-standard wiring may produce hazards and will not justify the confidence which users are entitled to place in grounding type receptacles when they encounter them in their residential, working, educational, assembly or recreational areas.

Receptacle 70 is correctly wired in accordance with the standard wiring connections prescribed for it in the National Electrical Code.

Receptacles 72, 74, 76, 78, 80, 82 and 84 are wired to represent the following various manners of wiring which do not conform with the standard requirement of the National Electrical Code:

| | |
|---|---|
| Receptacle 72: | Reversed Polarity |
| Receptacle 74: | Open Ground |
| Receptacle 76: | Open Neutral |
| Receptacle 78: | Open Hot Line |
| Receptacle 80: | Hot Line and Ground Wires Reversed |
| Receptacle 82: | Hot Line on Neutral; Hot Terminal Open |
| Receptacle 84: | Two Line Terminals and no Ground Terminal |

Another part of this demonstration is to show how the above listed connections, not in compliance with National Electrical Code standard wiring method, can be detected and identified.

A receptacle testing device 86 is shown in FIG. 1. This device is more fully described in U.S. Pat. No. 3,383,588. It includes three prongs which may readily be inserted into a conventional grounded receptacle. The device also includes three indicator lights which are white, yellow, and red. If the device is plugged into an accurately wired receptacle it will register with the yellow and white lights on. If it is inserted into an incorrectly wired receptacle it will register various color codes which can be analyzed to determine the particular error in the wiring of the receptacle. These codes are illustrated in a code panel 88 which is directly above the receptacles on the front panel of device 10. For example, the reversed polarity receptacle 72 will yield a yellow and a red color code on the testing device. The open ground receptacle 74 will yield a yellow light on the testing device. The open neutral receptacle 76 will yield a white light on the testing device. The open hot receptacle 78 will yield no light, the hot ground reverse receptacle 80 will yield a white and a red light, the hot on neutral — on open receptacle 82 will yield a red light. Receptacle 84 includes only two terminals. However, such a receptacle may be grounded by an adapter such as adapter 90 which has a pigtail 92 thereon. Pigtail 92 may be operatively secured to a ground such as ground terminal 94 shown on the panel. Thus when the receptacle 84 has been adapted by use of adapter 90, it will register a yellow and a white light on the testing device, thereby indicating that it is adequately grounded and correctly wired.

Since receptacle testers other than the one herein described (U.S. Pat. No. 3,383,588) may be used, and since they may utilize somewhat different coding of their indicating lights, the receptacle wiring code panel 88 may be replaced or covered by a similar panel showing the lighting pattern code for whichever receptacle is available to the user of the demonstrator.

Thus it can be seen that the demonstrator device provides means for demonstrating the GFCI, the meaning of "effective grounding" and the manner in which receptacles can be tested to determine if they have been accurately wired. The device therefore accomplishes at least all of its stated objectives.

We claim:

1. An electrical grounding demonstrator comprising;
    a first circuit having an indicator light representing a human ground fault situation, said first circuit having a ground fault circuit interrupter therein, first switch means being in said first circuit for alternatively switching said ground fault circuit interrupter into and out of said first circuit,
    a second circuit having two resistors therein, said resistors having different predetermined resistance values, a volt meter being in said second circuit, and second switch means for connecting said volt meter alternatively across each of said resistors to measure the respective voltage drops across said resistors,
    a plurality of electrical receptacles, each of said receptacles being wired differently to illustrate various wiring errors, one of said receptacles being wired correctly,
    a power circuit connected to said first circuit, said second circuit, and said electrical receptacles, said power circuit having a safe-on switch for selectively introducing power to said circuits,
    a ground loop impedance tester having a probe,
    a plurality of ground loop impedance terminals for selectively receiving said ground loop impedance tester probe, each of said terminals being connected at various points in said power circuit to illustrate variations in ground loop impedance at said points in said power circuit.

2. A device according to claim 1 wherein said ground loop impedance terminals comprise a first terminal connected to an open circuit, a second terminal connected to one of said resistors, a third terminal connected to the other of said resistors, and a fourth terminal connected to the grounded neutral line of said power circuit.

3. A device according to claim 1 wherein said receptacles include grounding receptacles wired to represent reversed polarity, open ground, open neutral, open hot, hot and ground reversed, hot on neutral-hot open, and a two terminal receptacle without ground, wiring situations.

* * * * *